UNITED STATES PATENT OFFICE.

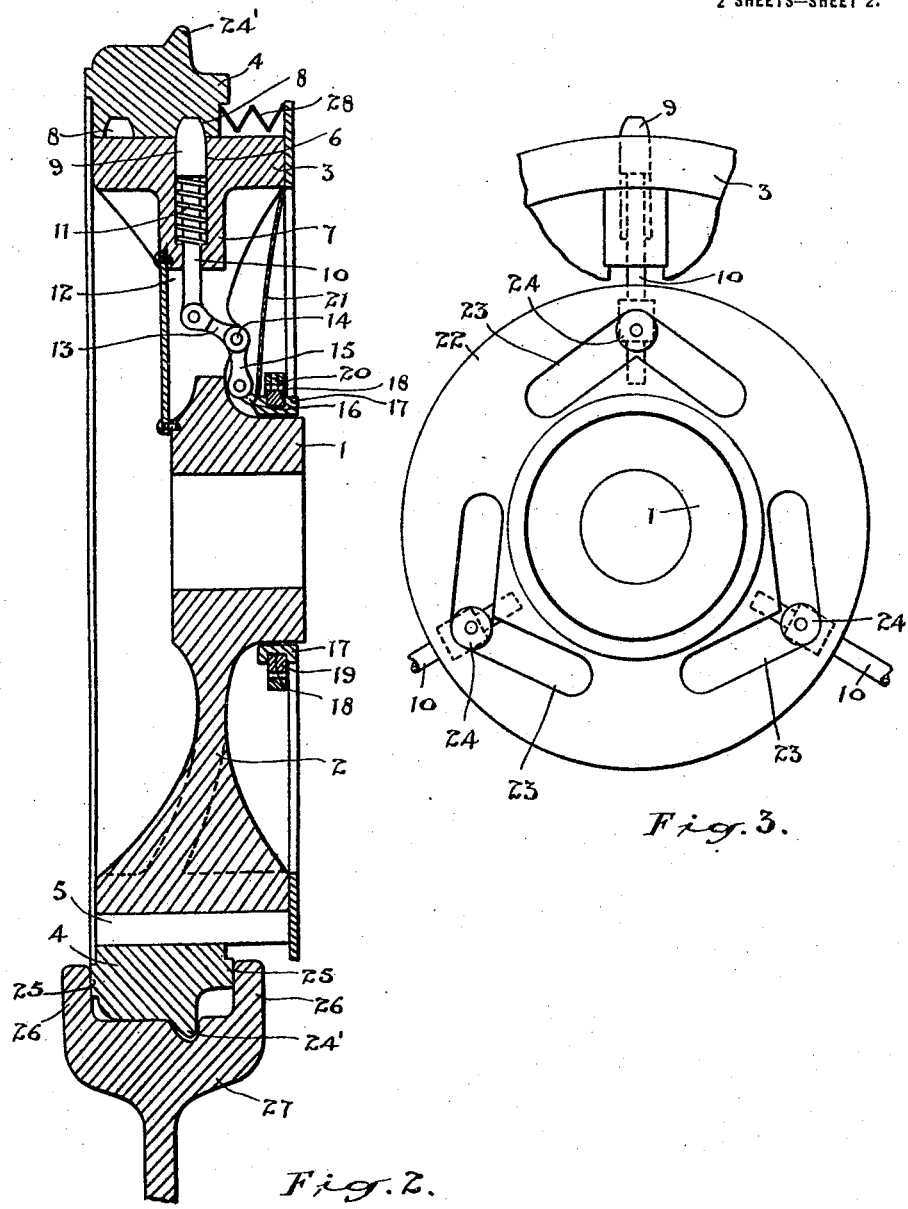

JOHN SWEENEY, OF TORONTO, ONTARIO, CANADA.

ADJUSTABLE CAR WHEEL.

1,413,072.　　　　　Specification of Letters Patent.　　Patented Apr. 18, 1922.

Application filed April 9, 1921. Serial No. 460,132.

*To all whom it may concern:*

Be it known that I, JOHN SWEENEY, a subject of the King of Great Britain, and resident of the city of Toronto, county of York, Province of Ontario, in the Dominion of Canada, have invented certain new and useful Improvements in Adjustable Car Wheels, described in the following specification and illustrated in the accompanying drawings, that form part of the same.

The principal objects of the invention are to enable the operation of cars upon different gauges of track and to provide a wheel which may be shifted in a lateral direction in order to alter the gauge between the wheel flanges, and to devise a construction which will be strong and durable and will be easily operated.

The principal feature of the invention consists in the novel construction of wheel whereby the position of the flange may be altered and it may be securely locked in different positions and whereby the lateral movement of the wheel flange section may be effected while the car is in operation.

In the drawings, Figure 1 is a side elevational view showing the outward side of my improved wheel.

Figure 2 is a transverse section through the line 2—2 of Figure 1, showing the shifting rail in contact with the movable flange section or tire.

Figure 3 is an elevational detail of a modified form of lock operating device.

Figure 1:
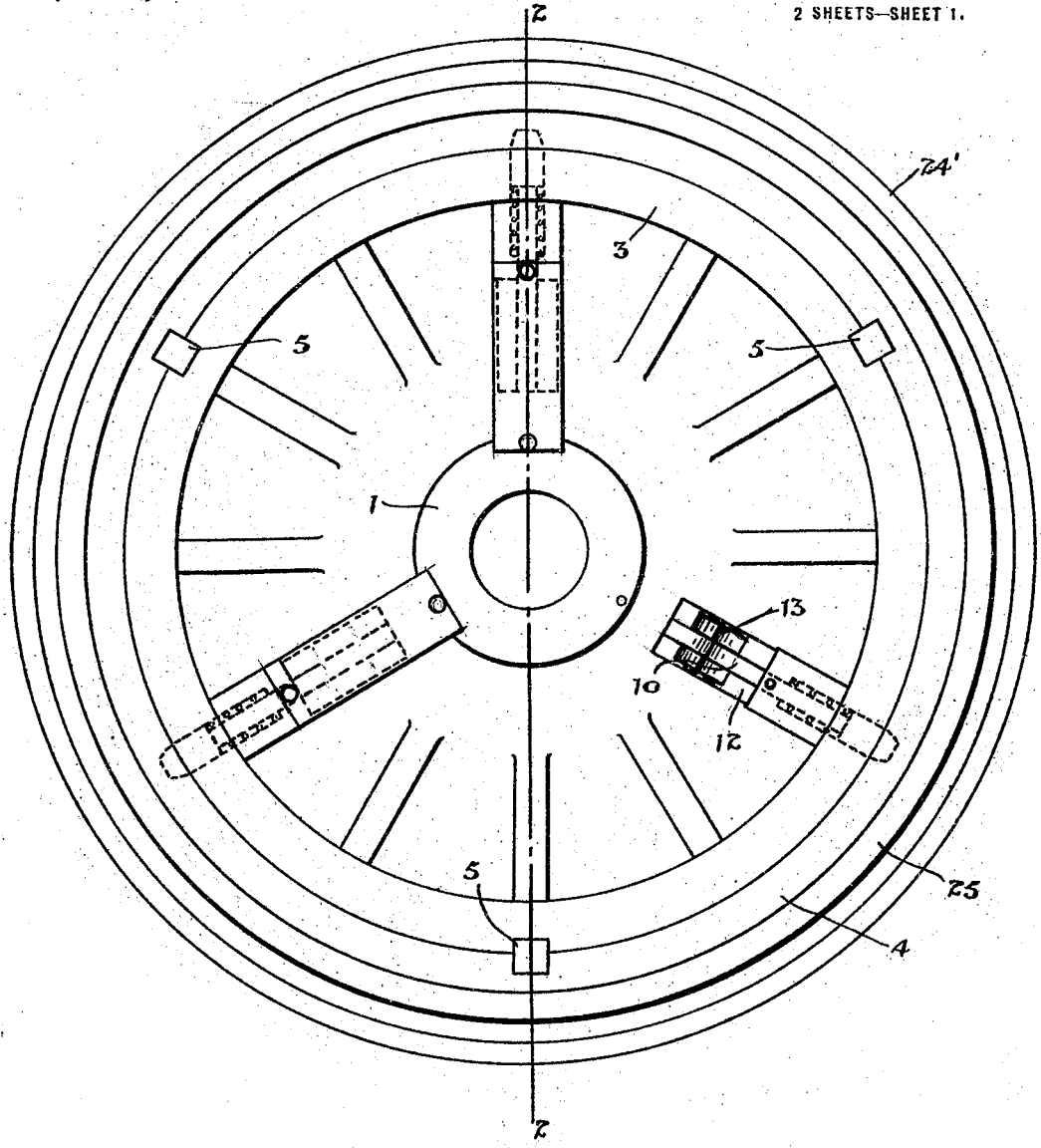

It has been found that in various communities there has been a digression made from standard gauge in the laying of street railway tracks and with the growth of these communities and the entrance of radial systems, the standard railway gauge, which naturally is adopted by the radial line in order to carry railway freight and express cars, does not harmonize. Under such circumstances it has been impossible to operate radial cars upon the street railway lines and inversely the street railway cars are prohibited from operating on the radial lines and it is frequently desirable that an interchange of traffic be had. The difference in gauge is usually so slight as to render impossible the use of a third rail. In order to overcome the difficulty, I have devised a form of wheel which will enable cars to travel on either gauge of track.

The wheel herein shown is designed with standard dimensions of tread diameter and clearances and it consists of a hub portion 1 which is secured to the axle of the car in the usual manner and has a flanged web 2 supporting a rim 3. A tire member 4 encircles the periphery of the rim 3 and is narrower than said rim and is a sliding fit thereon, being adapted to slide transversely of the said rim. Suitable keys 5 are secured in the rim 3 and extend into the inner perimeter of the tire 4, thus rotatably connecting the tire with the rim without interfering with the transverse movement.

At intervals around the perimeter of the rim 3 are arranged the squared sockets 6 which extend radially inward into the enlarged portions 7 and the inner perimeter of the tire is provided with tapered recesses 8 arranged to register with the sockets 6 when the tire is in different positions on the rim.

Bolt members 9 are slidably arranged in the sockets 6 and have tapered outer ends fitting the recesses 8 and said bolts are formed with round stems 10 around which and within the sockets 6 are arranged the spiral compression springs 11. These springs engaging the under portions of the bolt heads hold the bolts out in positive engagement with the recesses in the tire. The stems 10 extend radially inward into the openings 12 in the webbed wheel.

Bell crank members 13 are pivotally connected to the inner ends of the bolts 10 and are pivotally supported on transverse pivots 14 on the wheel centre. The radial legs 15 of the bell cranks extend inwardly toward the hub and are pivotally connected to lugs 16 on a ring 17 which rotatably encircles the inner end of the hub. The ring is provided with a circular groove 18 in which is loosely arranged the ring 19 connected with a yoke member 20 which is suitably mounted to operate to move the ring 17 inwardly or outwardly to operate the lock bolts to lock or unlock the tire. A dust guard 21 of disc form encloses the bell crank connections.

A modified structure for operating the lock bolts is illustrated in Figure 3. A flanged ring 22 is formed with V-shaped slots 23 which engage roller pins 24 secured to the lock bolts 9. This ring is retarded by a suitable brake and when retarded the movement of the slotted flange operates the bolts.

The tire 4 is provided with the usual flange 24' and is preferably provided with edge flanges 25 which form rubbing surfaces to engage the upwardly extending flanges 26 of the operating rail 27 which extend on either side of the wheel. This double flanged rail is laid between the adjacent ends of the two different gauges of trackway and in operation the adjustable wheels which are arranged at one side of the car, pass between the upwardly extending flanges of the guide rail. The lock bolts are then operated either by manual or automatic means, releasing the tire. The side pressure of the guide rail causes the tire to slip laterally to accommodate itself to the change of gauge and the bolts are again moved outwardly as the adjacent recesses 8 are brought into register therewith. The tire is thus locked securely in the changed position.

The bolts 9 are of sufficient size and number to provide an adequate factor of safety against shearing as also are the keys 5. These points are of course important in that the wheel must be strong enough to withstand all strains but the strength of the keys is only required to be equal to the strength of the flange engaging the track in its ordinary travel.

The mechanism is extremely simple and cannot get out of order and it is strong and durable.

The peripheral surface of the rim and the engaging surface of the tire may be lubricated in any suitable manner and if necessary may be protected from mud and dirt by a suitable guard, a folding bellows casing 28 being shown. The required latitude of movement in a wheel of this kind is not great, as gauges do not vary more than a few inches but by providing a wheel that is capable of being shifted laterally to accommodate this difference in the width of gauge, a very valuable result is achieved, as it enables interchange of service between systems which cannot possible otherwise co-operate.

What I claim as my invention is:—

1. An adjustable car wheel having the tire movable laterally in relation to the wheel centre, and means carried on the wheel centre for locking the tire in adjusted positions.

2. An adjustable car wheel, comprising, a wheel centre fixed to the axle, a tire transversely slidable on said wheel centre and adapted to rotate therewith, and radial bolts adapted to lock said tire in adjusted positions.

3. An adjustable car wheel, comprising, a wheel centre having a cylindrical peripheral flange, a tire slidably encircling said flange, keys non-rotatably securing said tire to said flange, radial bolts supported in said wheel centre, recesses in the inner periphery of said tire adapted to receive the outer ends of said radial bolts, and means for withdrawing said bolts from engagement with the tire.

4. An adjustable car wheel, comprising, a wheel centre having a cylindrical periphery, a tire slidable and non-rotatable on said wheel centre, bolts radially supported in said wheel centre and adapted to lock said tire in adjusted positions thereon, bell cranks pivotally connected to said bolts and supported on the wheel centre, and means for operating said bell cranks in unison to operate the bolts radially.

5. An adjustable car wheel, comprising, a wheel centre having a cylindrical periphery, a tire slidable and non-rotatable on said wheel centre, bolts radially supported in said wheel centre and adapted to lock said tire in adjusted positions thereon, a bell crank pivotally connected to each of said bolts, a ring slidably arranged on said wheel centre and operatively connected to the inner ends of said bell cranks, and means for moving said ring inwardly or outwardly to operate said bolts.

6. In an adjustable car wheel, the combination with the guide rail adapted to exert side pressure against the wheel tire, of a wheel centre, a flanged tire non-rotatable and transversely movable upon said centre, and means for locking said tire from transverse movement.

JOHN SWEENEY.